April 19, 1955     L. M. PLANSOEN ET AL     2,706,699
METHOD OF MAKING A HIGHLY STRETCHABLE
LAMINATED KNITTED FABRIC
Filed Jan. 2, 1952
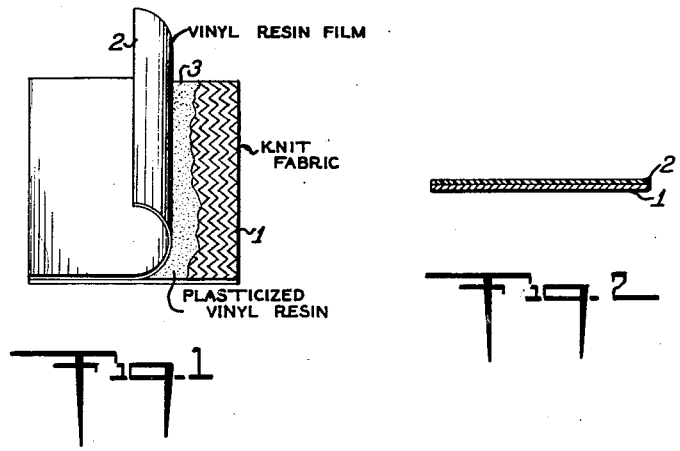
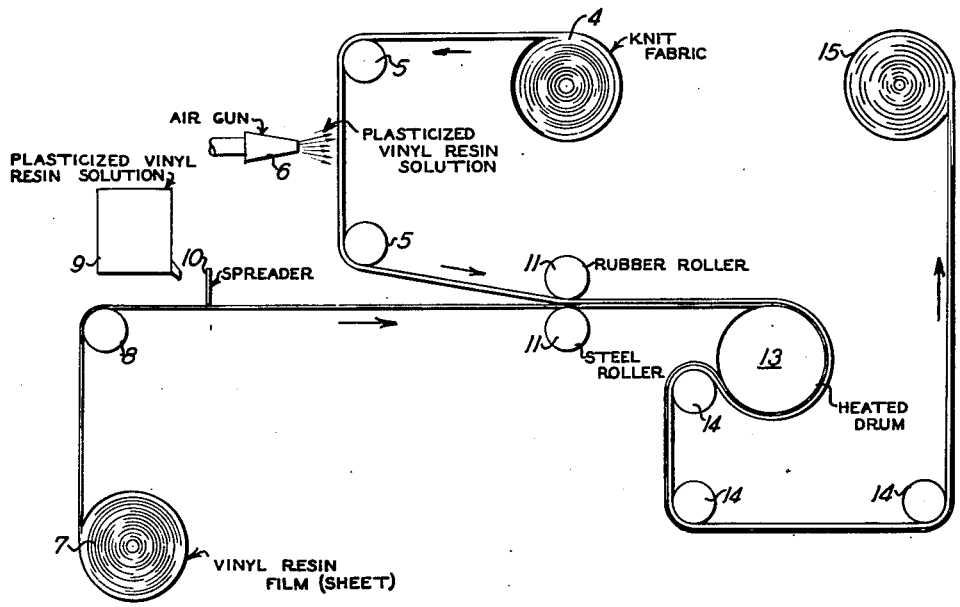
INVENTORS
LOUIS M. PLANSOEN
ERNEST M. SEAMAN
BY 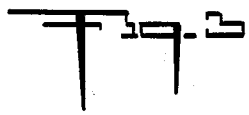
ATTORNEY

United States Patent Office 2,706,699
Patented Apr. 19, 1955

2,706,699

METHOD OF MAKING A HIGHLY STRETCHABLE LAMINATED KNITTED FABRIC

Louis M. Plansoen, Upper Montclair, and Ernest M. Seaman, Nutley, N. J., assignors to The Federal Leather Company, Belleville, N. J., a corporation of New Jersey Application January 2, 1952, Serial No. 264,657

5 Claims. (Cl. 154—140)

The present invention relates to the process for making a stretchable fabric which is laminated to a plastic resin film, and the unitary laminated product which is stretchable. More particularly the invention relates to the process for making knit goods type fabric laminated to a thermoplastic resin film, such as a vinyl resin film, and which unitary laminated fabric is stretchable.

Laminated fabrics have heretofore been produced but the stretching properties have been extremely limited. For certain purposes, such as for upholstery, it is necessary to have a substantial stretch in order to provide the necessary stretching in rounding corners, backs and arms of furniture, for example. The present invention is adapted to provide as much as 200% stretch and serves to give a smooth, neat and closely fitting upholstery covering, which is suitable for household furniture as well as for the interior upholstery or covers for automobiles.

In accordance with the present invention a knitted fabric made of cotton, wool or other base material is put through a coating machine in which it passes through a series of rollers, and one surface of the knitted fabric is spray coated with a plasticized vinyl resin solution in a volatile organic solvent therefor which is applied substantially uniformly over the entire width of the fabric by a series of air guns operated with a controlled air pressure. The solvent may be a single solvent, such as methyl ethyl ketone, or it may be a mixture of solvents in which the plasticized vinyl resin is soluble and which serves to retard slightly the drying of the plasticized vinyl resin solution and to prevent the cloth from shrinking to any marked degree. There is some evaporation of the solvent from the spray produced by the air guns. The spray coat is applied in an amount so that the face of the fabric has a minimum of penetration. Simultaneously, a film of thermoplastic resin, which varies in thickness, depending on the specific need, preferably between about 4/1000 to about 30/1000 inch, and of the same width as the knitted fabric, is put through a coating machine, and a coating of plasticized vinyl resin dissolved in a volatile solvent therefor, such as methyl ethyl ketone, is applied to one face of the film of thermoplastic resin. Both the knitted fabric and the film may be carried over the same machine in the process. The lamination of the knit fabric to the film of thermoplastic resin is accomplished while the plasticized resin solutions on the fabric and on the film are in a semi-dry state so that they will readily unit to form a homogeneous combining layer. In order to unite the knitted fabric and vinyl resin film, the two flat surface products are passed with the coated sides adjacent to each other between two rolls, usually one of metal (steel) and the other of rubber, so that the desired resilient uniting pressure may be applied. The steel roll or drum is preferably heated to a moderate temperature in order to properly fuse the two materials together and to give a strong fastening bond between them. During this operation, the heat of the steel drum is so controlled so as not to entirely dry the solution, but to cause sufficient drying so that the coatings and the materials to which they are attached, namely the thermoplastic film and the knitted fabric, are strongly bonded. The residue of the solvent remaining in the coatings between the knitted fabric and the vinyl resin film is then driven off by the passage of the laminated material over a hot metal (steel) drum, the temperature of the drum being controlled within desired limits, such as from about 280° F. to about 310° F.

It is important that when the knitted fabric, such as cotton, is coated, that the spraying of the plasticized resin solution be reasonably uniformly directed over the entire width of the fabric and that the amount applied is such that the face of the fabric is scarcely penetrated. That is the purpose for the selection of spray coating. It is likewise important that the lamination of the knit fabric to the plastic film be accomplished while the solution on the fabric and the solution on the film are in a semi-dry state. In that subsequent step wherein there is removal of the residue of solvent, the hot drum drives the solvent off through the knitted fabric.

From the above it will be perceived that one major purpose of the present invention is to laminate a knitted fabric to a film of thermoplastic resin to secure a stretchable laminated fabric as a single product.

Another object is to produce as a unitary covering material a knitted fabric laminated to a thermoplastic type of resin, which covering material has a directional stretch up to 200% without the separation of the layers and without cracking or otherwise damaging the material.

The above and other features and/or objects of the present invention will be more fully understood from the following description when read in connection with the accompanying drawing, wherein:

Figure 1 is a plan view of the stretchable resin film laminated to a knitted fabric, the two strips being partly removed;

Fig. 2 is a transverse sectional view of the finished material of Fig. 1;

Fig. 3 is a diagrammatic plan view of an apparatus for producing a unitary stretchable knitted fabric laminated to a thermoplastic resin.

From Figs. 1 and 2 of the drawing, the knitted fabric is represented by the numeral 1 and the vinyl resin film by 2. Since the two flat sheet-like materials are fused or bonded together the plasticized vinyl resin will not visibly appear as the distinct layer as Fig. 1 might lead one to conclude. The bond is very strong because of the manner in which the two respective surfaces have been joined.

Looking at Fig. 3 it will be seen that the knitted fabric in a roll 4 passes over rollers 5 of the coating machine. As it advances a plasticized solution of a vinyl resin in a volatile organic solvent therefor is sprayed from a series of air guns 6 whereby the entire outer surface width is uniformly coated. This coating should be applied by spraying in order to have a minimum of penetration of the fabric. The roll of vinyl resin in film (sheet) form 7 is passed over roller 8 and as it advances a solution of plasticized vinyl resin solution in a volatile solvent therefor contained in vessel 9 is applied to the upper surface by means of a spreader 10. The solution should be applied to this film reasonably uniformly and whereby a good coating is secured.

The two sheet-like materials, with their respective inner surfaces coated then pass through two coacting rollers 11, one being of rubber and the othed of metal (steel). The steel roller is preferably heated in order to fuse together these two sheet-like materials and give a resulting satisfactory bond. But the heat must be controlled so as not to entirely dry the solution in this operation. However, the stage attained should be sufficiently dry to cause the two materials to bond satisfactorily. As the vinyl resin film bonded to the superimposed knit fabric sheet thereafter passes over a heated steel drum the residue of the solvent remaining between the two sheet-like materials (film and fabric) is then expelled. Since the vinyl resin film is impervious, the solvent in it is driven off through the pervious knitted fabric material. The fabric laminated to the vinyl resin film is passed over rollers 14 and wound as a roll 15. A temperature of 280° F.–310° F. is optimum for heated steel drum or roller 13.

The resulting product of the method above described is a stretchable knitted fabric laminated to a vinyl resin film and is a single flat surfaced product having a directional stretch up to 200%, without the separation of the layers and without cracking and otherwise damaging the material.

In place of methyl ethyl ketone as a solvent for the plasticized vinyl resin material employed, diisobutyl ketone, or methyl isobutyl ketone, or acetone, or ketone mixtures may be used. Or if desired, methyl ethyl ketone, or other ketone above referred to may be admixed with ethyl acetate, butyl acetate, methyl Cellosolve, methyl Cellosolve acetate, isophorone, isopropyl acetate, or cyclohexanone, to provide a suitable solvent admixture.

In carrying out the invention the thermoplastic resin films employed are of the following groups: copolymers of vinyl chloride and vinyl acetate, copolymers of vinyl chloride and vinylidene chloride, and polyvinyl chlorides.

The coating which is applied to the knitted fabric and the vinyl resin film is a plasticized vinyl resin in solution in a volatile organic solvent therefor, such as those mentioned supra. The plasticizer may be any of the conventional plasticizers; there is no novelty alleged in the coating composition as such and per se.

Previously it has been brought out in several places, referring to the base material which is used, that a knitted fabric of cotton, wool or other composition may be employed. Such is made on a circular knitting machine, then cut open and laid out flat. It then has the form of a rectangular sheet. In order to prevent unravelling or wrinkling or curling of the edge of the fabric while being subjected to the process of the present invention, about one inch of the cut selvedged edge is treated with a starch solution or other adhesive material. This step of treating the edges in this manner is not a true part of the present invention, however.

The thermoplastic laminated knitted backed fabric made by the method of the present invention possesses a phenomenally large stretch. Such products find particular utility as upholstery coverings because of this property and the fact that such stretch does not result in the separation of the layers, cracking of the material, or other damaging effects.

The finished product made in accordance with the method of the present invention is ready for further processing, such as embossing, printing or any other type of finish such as may be required commercially to produce any form of material as may be desired in the industry.

It will be understood that various changes or modifications may be made in the product and method above described as will be apparent and understood by those skilled in the art without departing from the spirit of the invention or the scope of the claims annexed hereto.

Having thus described the invention, what is claimed as new is:

1. In the method for the manufacture of laminated fabric products which possess high stretching properties without the separation of layers and without cracking, the steps of spray coating one surface of a knitted fabric in sheet form, as it advances, with a plasticized vinyl resin solution in methyl ethyl ketone, over substantially the entire width of the knitted fabric, employing such a quantity of the solution and care that the face of the fabric is substantially coated but there is a minimum of penetration beneath the surface, coating one surface of a thermoplastic resin film from the group consisting of copolymers of vinyl chloride and vinyl acetate, copolymers of vinyl chloride and vinylidene chloride, and polyvinyl chlorides, said plasticized thermoplastic resin film having a thickness of about $4/1000$–$30/1000$ inch, as it advances, with a plasticized vinyl resin solution in methyl ethyl ketone, then passing the two flat surface sheets with the coated sides adjacent to each other through two rollers, one of metal and the other of rubber, so that a resilient uniting pressure is applied, the metal roller being heated under such control that the solution is not entirely vaporized but sufficient dryness does ensue that the film and fabric are strongly bonded, then further advancing the knitted fabric laminated to the thermoplastic resin and passing it over a hot metal drum, the temperature of which is approximately 280° F.–310° F. to drive off the solvent in the merged coating through the fabric.

2. In the method for the manufacture of laminated fabric products which possess high stretching properties without the separation of layers and without cracking, the steps of spray coating one surface of a knitted fabric in sheet form, as it advances, with a plasticized vinyl resin solution in a volatile organic solvent therefor, over substantially the entire width of the knitted fabric, employing such a quantity of the solution and care that the face of the fabric is substantially coated but there is a minimum of penetration beneath the surface, coating one surface of a thermoplastic resin film from the group consisting of copolymers of vinyl chloride and vinyl acetate, copolymers of vinyl chloride and vinylidene chloride, and polyvinyl chlorides, as it advances, with a plasticized vinyl resin solution in a volatile organic solvent therefor, then passing the two flat surface sheets with the coated sides adjacent to each other through two rollers, so that a resilient uniting pressure is applied, one of which rollers being heated under such control that the solution is not entirely vaporized but sufficient dryness does ensue that the film and fabric are strongly bonded, then further advancing the knitted fabric laminated to the thermoplastic resin and passing it over a hot drum, the temperature of which is approximately 280° F.–310° F. to drive off the solvent in the merged coating through the fabric.

3. In the method for the manufacture of laminated fabric products which possess high stretching properties without the separation of layers and without cracking, the steps of spray coating one surface of a knitted fabric in sheet form, as it advances, with a plasticized vinyl resin solution in mixed volatile organic solvents therefor, over substantially the entire width of the knitted fabric, employing such a quantity of the solution and care that the face of the fabric is substantially coated but there is a minimum of penetration beneath the surface, coating one surface of a thermoplastic resin film from the group consisting of copolymers of vinyl chloride and vinyl acetate, copolymers of vinyl chloride and vinylidene chloride, and polyvinyl chlorides, as it advances, with a plasticized vinyl resin solution in mixed volatile organic solvents therefor, then passing the two flat surface sheets with the coated sides adjacent to each other through two rollers, so that a resilient uniting pressure is applied, one of which rollers being heated under such control that the solution is not entirely vapoorized but sufficient dryness does ensue that the film and fabric are strongly bonded, then further advancing the knitted fabric laminated to the thermoplastic resin and passing it over a hot drum, the temperature of which is approximately 280° F.–310° F. to drive off the solvent in the merged coating through the fabric.

4. In the method for the manufacture of laminated fabric products which possess high stretching properties without the separation of layers and without cracking, the steps of spray coating one surface of a knitted fabric in sheet form, as it advances, with a plasticized vinyl resin solution in a volatile organic solvent therefor, over substantially the entire width of the knitted fabric, employing such a quantity of the solution and care that the face of the fabric is substantially coated but there is a minimum of penetration beneath the surface, coating one surface of a thermoplastic resin film from the group consisting of copolymers of vinyl chloride and vinyl acetate, copolymers of vinyl chloride and vinylidene chloride, and polyvinyl chlorides, as it advances, with a plasticizer vinyl resin solution in a volatile organic solvent therefor, then passing the two flat surface sheets with the coated sides adjacent to each other through two rollers, so that a resilient uniting pressure is applied, one of which rollers being heated under such control that the solution is not entirely vaporized but sufficient dryness does ensue that the film and fabric are strongly bonded.

5. In the method for the manufacture of laminated fabric products which possess high stretching properties without the separation of layers and without cracking, the steps of spray coating one surface of a knitted fabric in sheet form, as it advances, with a plasticized vinyl resin solution in mixed volatile organic solvents therefor, over substantially the entire width of the knitted fabric, employing such a quantity of the solution and care that the face of the fabric is substantially coated but there is a minimum of penetration beneath the surface, coating one surface of a thermoplastic resin film from the group consisting of copolymers of vinyl chloride and vinyl acetate, copolymers of vinyl chloride and vinylidene chloride, and polyvinyl chlorides, as it advances, with a plasticized vinyl resin solution in mixed volatile organic solvents therefor, then passing the two flat surface sheets with the coated sides adjacent to each other through two rollers, so that a resilient uniting pressure is applied, one of which rollers being heated under such control that the solution is not entirely vaporized but sufficient dryness does ensue that the film and fabric are strongly bonded.

References Cited in the file of this patent

UNITED STATES PATENTS

| | | | |
|---|---|---|---|
| 375,073 | Kayser | Dec. 20, | 1887 |
| 1,323,212 | Bulley | Nov. 25, | 1919 |
| 1,638,254 | Freydberg et al. | Aug. 9, | 1927 |
| 2,399,027 | Heribert | Apr. 23, | 1946 |
| 2,414,424 | Stevens, Jr. | Jan. 14, | 1947 |
| 2,450,948 | Foster | Oct. 12, | 1948 |
| 2,453,052 | Van Etten | Nov. 2, | 1948 |
| 2,485,725 | Francis, Jr. | Oct. 25, | 1949 |
| 2,533,976 | Teague | Dec. 12, | 1950 |
| 2,573,773 | Rowe | Nov. 6, | 1951 |